United States Patent [19]

Robson

[11] 4,070,647

[45] Jan. 24, 1978

[54] ERROR MEASUREMENT FOR DIGITAL SYSTEMS

[75] Inventor: Stephen Ronald Robson, Chelmsford, England

[73] Assignee: The Marconi Company Limited, England

[21] Appl. No.: 675,694

[22] Filed: Apr. 9, 1976

[30] Foreign Application Priority Data

Apr. 11, 1975 United Kingdom ............... 15091/75

[51] Int. Cl.² .............................................. G06F 11/00
[52] U.S. Cl. ......................................... 340/146.1 AX
[58] Field of Search ............................ 340/146.1 AX; 235/151.13; 325/41

[56] References Cited

U.S. PATENT DOCUMENTS

| | | | |
|---|---|---|---|
| 2,943,149 | 6/1960 | Irland et al. | 340/146.1 AX |
| 3,036,290 | 5/1962 | Zarouni | 340/146.1 AX |
| 3,177,351 | 4/1965 | Freiman | 340/146.1 AX |
| 3,618,015 | 11/1971 | Homonick | 340/146.1 AX |
| 3,725,860 | 4/1973 | Kemper et al. | 340/146.1 AX |

*Primary Examiner*—Charles E. Atkinson

*Attorney, Agent, or Firm*—Diller, Brown, Ramik & Wight

[57] ABSTRACT

The quality of a transmission link is demonstrated by the number of samples of predetermined bit length (N) containing more than one bit in error. The distribution of errors, as it is called is determined by detecting the occurrence of an error, counting the number of bits from one error to the next error, evaluating for each sequence $i$ of errors in which no three consecutive errors span more than (N + 1) bits the sum $$S_i = N - a_1 + \sum_{j=1}^{j=m-2} a_j$$

where $a_j$ = the number of bits from the jth error to the $(j + 1)$th error in the sequence, and $m$ = the number of errors in the sequence, and generating the cumulative sum $$S_T = \sum_i S_i.$$

8 Claims, 1 Drawing Figure

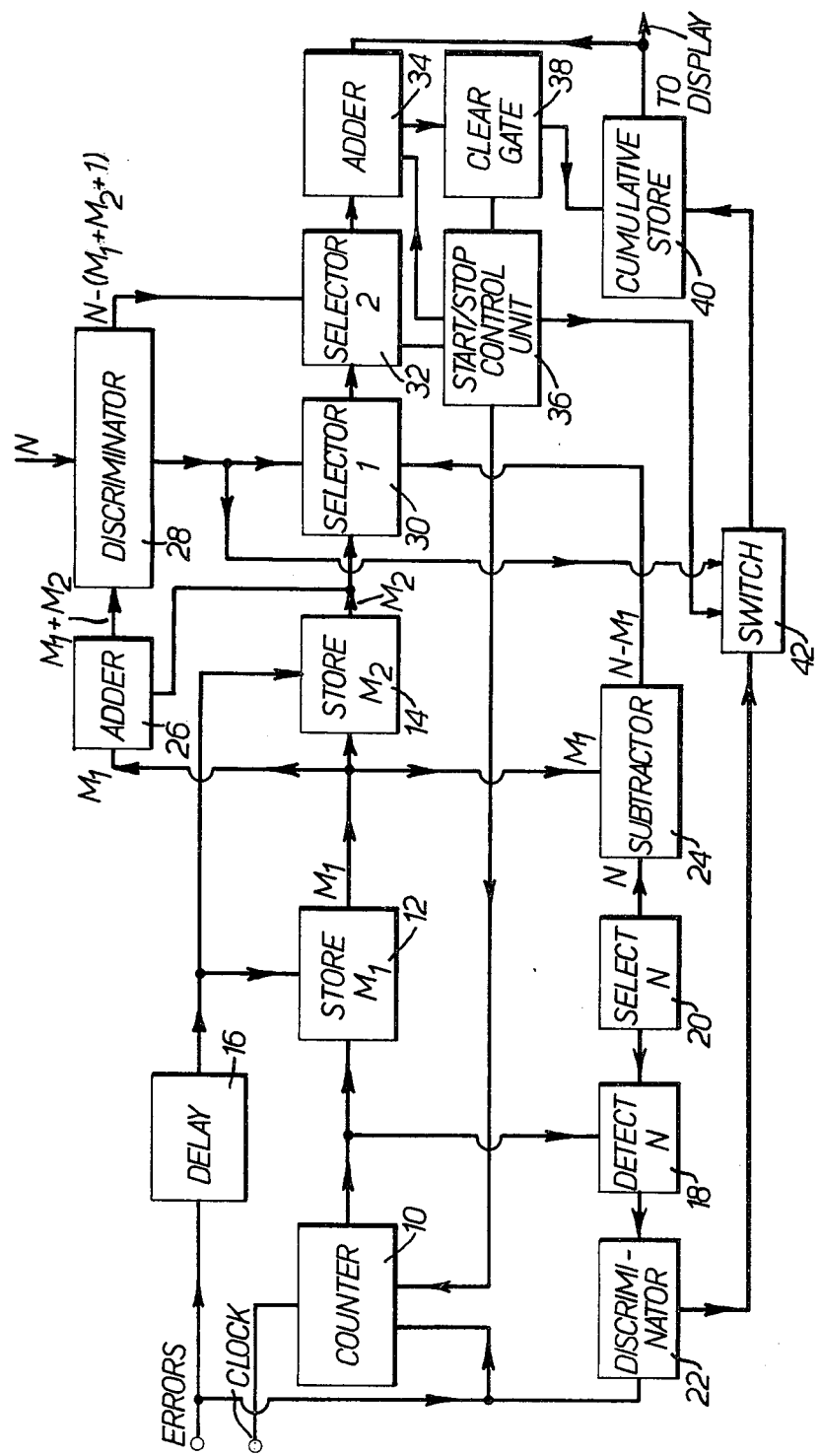

ERROR MEASUREMENT FOR DIGITAL SYSTEMS

The present invention is concerned with error measurement in digital systems.

It is often required in digital systems to ascertain the reliability of a transmission link by first detecting the errors and then determining the distribution of the errors. Errors caused by a transmission link may be detected by transmitting a known sequence and comparing what is received with a similar known sequence generated at the receiving end of the link to enable a comparison between the received sequence and the sequence generated at the receiving end to be effected. Preferably, the information transmitted should be random in nature, but as random sequences are difficult to correlate it is more common to use what are termed as pseudo-random sequences. Such sequences repeat after a certain number of integers, which is preferably very large, but within any repetition cycle, numbers of equal power (i.e. having the same number of binary digits) occur with equal frequency. A suitable system for error detection is described in copending application Ser. No. 464,907, now U.S. Pat. No. 3,895,349.

So as to provide a meaningful representation of the distribution of errors one could express the reliability of an apparatus by stating that an error rate of 1 in 1,000 is not exceeded for a given percentage of time. It should be made clear that by the term "distribution of errors" is meant not the number of errors that occur within a given sample of bits but the actual positions of the errors that occur within the sample. That is to say, if there were, for example, 10 errors in a sample of 1,000 bits duration the invention is concerned with whether the 10 errors occur evenly spaced, or two bunches of 5 consecutive bits, or in one bunch of 10, etc., since this is the factor that governs the reliability of a transmission link.

The present invention seeks to determine the number of samples of predetermined bit lengths containing more than one bit which is in error.

According to the present invention, there is provided a method of determining the number of samples in which the error rate in a bit stream exceeds 1 in N, where N is a predetermined sample size, by the steps of detecting the occurrence of an error in the bit stream, counting the number of bits from each error to the next, evaluating for each sequence ($i$) of errors in which no three consecutive errors span more than $(N + 1)$ bits, the sum $$S_i = N - a_1 + \sum_{j=1}^{j=m-2} a_j$$

where
  $a_j =$ the number of bits from the $j$th error to the $(j + 1)$th error in the sequence, and
  $m =$ the number of errors in the sequence, and generating the cumulative sum $$S_T = \sum_i S_i.$$

Preferably, compensation for inaccuracies resulting from any errors occuring within N bits from the beginning of the bit stream is provided by subtracting from $S_T$ the amount $N - (A_0 + A_1)$ where $A_0$ is the number of bits from the start of the bit stream to the first error and $A_1$ is the number of bits from the first error to the second error in the bit stream.

Preferably also compensation for inaccuracies resulting from any errors occurring within N bits from the end of the bit stream is provided by subtracting from the cumulative sum $S_T$ the amount $$N - (A_{z-1} + A_z + 1)$$

where
  $A_{z-1}$ equals the number of bits from the penultimate error to the last error, and
  $A_z$ equals the number of bits from the last error to the end of the bit stream.

Advantageously the proportion of samples in which an error rate in a bit stream exceeds 1 in N to the total number of samples taken is determined by the addition of means for comparing the sum $S_T$ with the total number of samples and display means for indicating the proportion of samples in which the error rate 1 in N is, in operation, exceeded.

The invention will now be described further, by way of example, with reference to the accompanying drawing which is a block circuit diagram of an arrangement for performing the method in accordance with the invention.

It should first of all be explained that the probability of exceeding an error rate of 1 in $10^4$ is not the same as the probability of exceeding 10 errors in $10^5$ bits. This point may be readily appreciated from the fact that for a given sequence containing only two adjacent errors an error rate of 1 in $10^4$ is exceeded for some portion of time but, as it contains no more than two errors, never is an error rate of 10 in $10^5$ exceeded. Thus, if one seeks to ascertain the number of times that an error rate of 1 in $10^4$ is exceeded one must take samples $10^4$ bits in size.

Considering now the sampling method, if one were to take adjacent samples, it would be possible for two adjacent errors to fall one in each sample so that if no other errors were present, no sample will contain more than one error. If no other errors were present, it would seem that no error rate of any form has been exceeded in either sample, whereas in fact, all error rates up to and including 1 in 2 have been exceeded for some period of time. To benefit from the distribution, the samples should overlap and, preferably, occur every bit. On the final analysis, using a sufficient number of adjacent samples will eventually yield the same results as this overlapping form of sampling though the time required to arrive at a true statistical result will be very much increased.

Assume now one is interested in determining the number of samples in which an error rate of 1 in N is exceeded. If $a_1$, the number of bits from the first error to the second, is less than N, the number of different positions that an imaginary scanning window (the size of a sample) containing both errors can assume is $N - a_1$. If a third error occurs $a_2$ bits after the second and if $a_1 + a_2$ is less than N then the number of positions which the window containing at least two errors can assume will be N. If a further error occurs $a_3$ bits later, provided that $a_2 + a_3$ is less than N, the number of positions of the window containing more than one error is increased by $a_2$. For a sequence ($i$) with $m$ errors in which no three consecutive errors span more than $N + 1$ bits, the number of positions that the window can assume containing more than one error is given by the series $S_i I = N - a_1 + a_1 + a_2 + a_3 \ldots + a_{m-2}$. i.e.

$$S_i = N - a_1 + \sum_{j=1}^{j=m-2} a_j$$

The number of terms in the above series will be determined by the number of times that $a_{j-1} + a_j$ is less than or equal to N. As soon as this sum exceeds N this series must be terminated and a new series started upon occurrence of two further errors with a separation of less than N−1.

Based upon this calculation, it is possible to calculate without scanning the proportion of time that any error rate is exceeded. For this, it is required to provide a record of the error positions as they occur and a simultaneous evaluation of the above series as determined by the values of $a$. The sums that are produced by repeated use of the series are accumulated and summed together giving a total of $S_T$. The ratio of this number to the total number of bits that were effectively scanned gives the fraction of time that the error rate of 1 in N was exceeded. This, however, may only be an approximation since the starting and ending conditions of the sequence of bits have been ignored. In most cases, the deviation from the precise fraction would be zero or negligibly small but it is possible to include correcting terms so as to derive the precise fraction required.

If the very first error in a bit stream occurs $A_0$ bits from the start and the second error $A_1$ bits later, $A_1$ being less than N, the difference $N - A_1$ will not necessarily be equal to the number of times the error rate 1 in N has been exceeded. For if $A_0 + A_1$ is less than N, the different positions a scanning window of N bits could assume containing both errors is reduced by the amount $N - (A_0 + A_1)$. Clearly if the very first bit is in error and the next error occurs $A_1$ bits later such that $A_1$ is less than N, then regardless of the actual value of $A_1$ there is only one position of a window N bits wide which would include both errors. An analogous argument applies to the end of any bit stream. Thus, corrective terms should be subtracted from the value $S_T$ in the event of errors occurring close to the beginning or the end of a sample.

The block circuit diagram in the accompanying drawing is of a unit for performing the following arithmetic operation on the error pulses from an error detector:

$$\Sigma (N - a_1 + \sum_{j=1}^{j=m} a_j^2) - G[N - (A_0 + A_1)] - H[N - (A_{z-1} + A_z + 1)]$$

Where:
G = 0 if $N - (A_0 + A_1)$ is negative
G = 1 if $N - (A_0 + A_1)$ is postive
H = 0 if $N - (A_{z-1} + A_z + 1)$ is negative
H = 1 if $N - (A_{z-1} + A_z 30\ 1)$ is positive and all the other terms are as previously defined.

It will be appreciated that the square brackets preceded by G and H are compensations for end errors and, clearly, if the second error and the penultimate error do not occur within N bits from the beginning or the end of a sample, respectively, then no corrections will need to be applied.

The circuit will first be described assuming that one is in the middle of a bit stream or run and subsequently it will be explained how corrections are applied at the beginning and the end of each run. During the course of each run, a counter 10 is reset by each error and counts the number of bits up to and including the next error, which after a certain delay afforded by a delay circuit 16 causes the count to be entered in a store 12, the count which was previously registered in the store 12 being transferred to a store 14. The data recorded in the stores 12 and 14 will be subsequently referred to as $M_1$ and $M_2$ respectively. It will be understood that upon arrival of an error signal, there is entered into the store 12 a count corresponding to the number of bits from the previous error and there is entered in the store 14 the number of bits from the previous error to the one before it.

A circuit 18 labelled "DETECT N" comprises a set of gates each operative to recognise when a predetermined count equal in value to N is reached by the counter 10. The value of N, which in effect is the size of the sampling window, may be selected by a block labelled "SELECT N" 20 which is a switch arranged to select the output of one of the gates comprised in the block 18.

In any sequence of errors in which no three consecutive errors span more than N + 1 bits the total number of windows containing an error, as previously explained, is given by $$N - a_1 + a_1 + a_2 \ldots + a_{m-2}$$

In continuously evaluating the sum, the first error is ignored since two errors are needed within a window in order for any error rate to be exceeded. Upon occurrence of the second error the total number of window positions containing two errors will be $N - a_1$. If a further error occurs then this sum is increased by $a_1$ and with subsequent errors by $a_2$, $a_3$ etc.

When an error arrives, the output of the counter 10 will indicate the number of bits from the previous error. If this number exceeds N then the total number of window positions containing errors is not increased. This total number is stored in a cumulative store 40 which is triggered by a signal generated by a discriminator 22. When an error is less than N bits away from the previous error the discriminator applies a pulse to the cumulative store 40 by way of a switch 42 whose function is explained below. With this and subsequent pulses in the sequence, the count in the cumulative store 40 is to be increased either by $(N - M_1)$ or by $M_2$, as the case may be, depending on whether the error is the second in the sequence or a subsequent error. At the occurrence of the second error in a sequence of errors the sum $(M_1 + M_2)$ automatically exceeds N. On the other hand, because of the way in which a sequence is defined i.e. a succession of errors in which no three consecutive errors span more than N+1 bits, upon occurrence of subsequent errors $(M_1 + M_2)$ is always less than or equal to N. The quantity $(M_1 + M_2)$ is evaluated by an adder 26 connected to the outputs of the stores 12 and 14. A subtractor 24 connected to the output of the store 12 and to the block 20 generates the quantity $(N - M_1)$. A discriminator 28 evaluates whether $(M_{1 + M_2})$ is less than or greater than N and controls a selector 30 in accordance with this decision such as to pass onto the output of the selector 30 either the value $M_2$ or the value $(N - M_1)$ depending on whether the error is the second in a sequence or a subsequent error. This value passes by way of a selector 32, whose function is explained below, to an adder 34 connected in a closed loop with the cumulative store 40. The output state of the adder 34 is equal to the sum of whatever value was stored in the cumulative store 40 and the value appearing at the output of selector 30. The pulse generated by the discriminator 22 upon occurrence of an error in the sequence triggers the cumulative store 40 such as to update its contents.

As so far described, the circuit is capable of calculating for all sequences of errors in a run, the number of windows of width N containing more than one error. The discriminator 22 after the occurrence of the second or subsequent error in a sequence triggers the cumulative store 40 to update its contents either by N − $M_1$, if the error is the second in a sequence or by $M_2$ if the error is a subsequent one.

The cumulative count in the store 40 may, as has been explained, be marginally incorrect as a result of errors occurring at the beginning and the end of a run. To compensate for these end errors, the circuit includes four additional blocks, namely, the earlier referred to switch 42 and selector 32 and a start/stop control unit 36 and a block 38 of clear gates.

At the start of a run, if the first error occurs $A_0$ bits after the beginning and the second $A_1$ bits after the first, $A_0 + A_1$ being less than N, then the number of windows containing an error will not be N − $A_1$, as would be the case for any other sequence, but merely $A_0$. To allow such a count to enter the cumulative store 40 the following sequence of events takes place. When an operating switch within the control unit 36 is thrown to start a run all the stores in the circuit, that is to say the cumulative store 40 and the stores 12 and 14, are cleared. Because the cumulative store 40 is arranged in a closed loop with the adder 34, it is necessary to include the clear gates 38 to allow this clearing to take place. The counter 10 is set to zero and also made to start counting at the same time as the error pulses from an error detector (not shown) are gated through. When the first error pulse arrives, the count in the counter 10 will have reached $A_0$ and this will be transferred into the store 12. The discriminator 22 will not, however, apply a trigger pulse to the cumulative store 40. When a subsequent error occurs $A_1$ bits later the count $A_0$ will enter the store 14 and the count $A_1$ will enter the store 12. If $A_0 + A_1$ is less than N the discriminator 28 would set the selector 30 in the manner previously described so as to update the contents of the cumulative store 40 by $M_2$, which in this case is $A_0$. This is actually the correct quantity to be registered in the cumulative store 40. Thus, at the beginning of a run providing $A_0 + A_1$, is less than N the first error is treated as though it were the second error of a sequence rather than the first.

At the end of a run, the previously referred to switch in the control unit 36 is thrown and this has the effect of applying a signal at the error input such as to transfer into the store 12 a count equal to the number of bits from the last error to the end of the run and at the same time there is transferred into the store 14 the number of bits between the last two errors. If the sum of these two quantities $M_1 + M_2$ is less than N then there should be subtracted from the cumulative sum within the store 40 the quantity [N − ($M_1 + M_2 + 1$)]. The decision as to whether $M_1 + M_2$ exceeds N is always carried out within the discriminator 28 during the course of a normal run. Furthermore, this same discriminator 28 inherently generates the quantity [N−($M_1 + M_2 + 1$)]. When the run is terminated, if ($M_1 + M_2$)<N the selector 32 is made to pass on to the adder 34 the quantity N − ($M_1 + M_2 + 1$) derived from the discriminator 28 rather than the output of the selector 30. When the discriminator determines that $M_1 + M_2$ is less than N it passes a trigger pulse to the cumulative store 40 by way of the switch 42 which is now controlled by the control unit 36 so as to pass on to the cumulative store 40 this trigger rather than the output of the discriminator 22.

The adder 34 will already have been changed to a subtractor by the control unit 36 (this being readily achieved with binary circuits in a manner well known per se) so that there is present at the output of the adder a quantity equal to the original contents of the cumulative store at the end of the run minus [N − ($M_1 + M_2 + 1$)] which is triggered into the cumulative store so replacing its previous content.

The output of the cumulative store is connected to a suitable display which indicates the number of windows in which the selected error rate was exceeded. If desired, this may be expressed as a percentage of the total number of windows that effectively scanned the whole signal of error pulses.

I claim:

1. A method of determining the number of samples in which the error rate in a bit stream exceeds 1 in N, where N is a predetermined sample size, by the steps of detecting the occurrence of an error in the bit stream, counting the number of bits from each error to the next, evaluating for each sequence (i) of errors in which no three consecutive errors span more than (N + 1) bits, the sum $$S_i = N - a_1 + \sum_{j=1}^{j=m-2} a_j$$

where $a_j$ = the number of bits from the jth error to the (j + 1)th error in the sequence, and m = the number of errors in the sequence, and generating the cumulative sum $$S_T = \sum_i S_i.$$

2. A method as claimed in claim 1 wherein compensation for inaccuracies resulting from any errors occurring within N bits from the beginning of the bit stream is provided by subtracting from $S_T$ the amount N − ($A_0 + A_1$) where $A_0$ is the number of bits from the start of the bit stream to the first error and $A_1$ is the number of bits from the first error to the second error in the bit stream.

3. A method as claimed in claim 2 wherein compensation for inaccuracies resulting from any errors occurring within N bits from the end of the bit stream is provided by subtracting from the cumulative sum $S_T$ the amount $$N - (A_{z-1} + A_z + 1)$$

where $A_{z-1}$ equals the number of bits from the penultimate error to the last error, and $A_z$ equals the number of bits from the last error to the end of the bit stream.

4. A method as claimed in claim 1 wherein the sum $S_T$ is compared with the total number of samples and the proportion of samples in which the error rate 1 in N is exceeded is indicated on a display means.

5. An apparatus for determining the number of samples in which the error rate in a bit stream exceeds 1 in N, where N is a predetermined sample size, including error detection means for detecting the occurrence of an error in the bit stream, counting means for counting the number of bits from each error to the next, summing means for evaluating, for each sequence (i) of errors in which no three consecutive errors span more than (N + 1) bits, the sum $$S_i = N - a_1 + \sum_{}^{j=m-2} a_j$$

where
- $a_j$ = the number of bits from the $j$th error to the $(j + 1)$th error in the sequence, and
- $m$ = the number of errors in the sequence, and means for generating the cumulative sum $$S_T = \sum_i S_i.$$

6. An apparatus as claimed in claim 5 wherein means are provided for compensating for inaccuracies resulting from any errors occurring within N bits from the beginning of the bit stream by subtracting from $S_T$ the amount $N - (A_0 + A_1)$ where $A_0$ is the number of bits from the start of the bit stream to the first error and $A_1$ is the number of bits from the first error to the second error in the bit stream.

7. An apparatus as claimed in claim 5 wherein means are provided for compensating for inaccuracies resulting from any errors occurring within N bits from the end of the bit stream by subtracting from the cumulative sum $S_T$ the amount $$N - (A_{z-1} + A_z + 1)$$

where
- $A_{z-1}$ equals the number of bits from the penultimate error to the last error, and
- $A_z$ equals the number of bits from the last error to the end of the bit stream.

8. An apparatus as claimed in claim 5 wherein there is provided comparison means for comparing the sum $S_T$ with the total number of samples and display means for indicating the proportion of samples in which the error rate 1 in N is, in operation, exceeded.

* * * * *